US008152947B2

(12) United States Patent  
Toyoda et al.

(10) Patent No.: US 8,152,947 B2
(45) Date of Patent: Apr. 10, 2012

(54) METHOD FOR PRODUCING DISPLAY DEVICE

(75) Inventors: Tomoyuki Toyoda, Kanuma (JP); Tsutomu Dejima, Utsunomiya (JP); Yoshihisa Shinya, Utsunomiya (JP); Yusuke Kamata, Utsunomiya (JP)

(73) Assignee: Sony Chemical & Information Device Corporation, Toyota (JP)

( * ) Notice: Subject to any disclaimer, the term of this patent is extended or adjusted under 35 U.S.C. 154(b) by 0 days.

(21) Appl. No.: 12/656,088

(22) Filed: Jan. 15, 2010

(65) Prior Publication Data

US 2010/0178834 A1 Jul. 15, 2010

Related U.S. Application Data

(63) Continuation of application No. PCT/JP2008/062855, filed on Jul. 16, 2008.

(30) Foreign Application Priority Data

Jul. 17, 2007 (JP) ................................. 2007-186360
Jan. 11, 2008 (JP) ................................. 2008-005027
Apr. 14, 2008 (JP) ................................. 2008-105109

(51) Int. Cl.
*B32B 43/00* (2006.01)
*B32B 37/00* (2006.01)
*B32B 38/10* (2006.01)
*B29C 65/54* (2006.01)
(52) U.S. Cl. ........... 156/94; 156/247; 156/701; 156/717
(58) Field of Classification Search .................... 156/64, 156/94, 247, 250, 701, 717
See application file for complete search history.

(56) References Cited

U.S. PATENT DOCUMENTS 5,514,294 A * 5/1996 Bohnert et al. ............... 510/411
2004/0180148 A1 * 9/2004 Hieda et al. .................... 428/1.1

FOREIGN PATENT DOCUMENTS

| JP | A-6-167681 | 6/1994 |
| JP | 06345499 A * | 12/1994 |
| JP | A-7-114010 | 5/1995 |
| JP | A-11-95210 | 4/1999 |
| JP | A-2004-184677 | 7/2004 |

(Continued)

OTHER PUBLICATIONS

English Abstract of JP 06-345499 (2011).*

(Continued)

*Primary Examiner* — Sing P Chan
(74) *Attorney, Agent, or Firm* — Oliff & Berridge, PLC

(57) ABSTRACT

A method for producing a display device includes: (a) coating a resin composition on at least one of a display part and a protective part, (b) closely adhering the display and protective parts via a resin composition interposed therebetween, and (c) arranging the cured resin layer between the display and protective parts by curing the resin composition by irradiating UV rays on an external side of the protective part. If a defect is detected, the method includes: (d) separating the display and protective parts by applying a wire to a side face of the cured resin layer where the protective and display parts are bonded and moving the wire through the cured resin layer, (e) peeling off and removing the cured resin adhered to the separated display and protective parts by a removing solution which contains an organic solvent, and (f) repeating steps (a) to (c).

5 Claims, 6 Drawing Sheets

FOREIGN PATENT DOCUMENTS

| | | |
|---|---|---|
| JP | A-2004-325788 | 11/2004 |
| JP | A-2005-55641 | 3/2005 |
| JP | A-2006-11212 | 1/2006 |
| JP | A-2006-169470 | 6/2006 |
| JP | A-2006-184872 | 7/2006 |
| JP | A-2007-072101 | 3/2007 |

OTHER PUBLICATIONS

International Search Report mailed Aug. 19, 2008 in corresponding International Application No. PCT/JP2008/062856.

Sep. 13, 2010 European Search Report issued in Application No. 08778206.2.

PCT International Preliminary Report on Patentability for Application No. PCT/JP2008/062855; mailed Feb. 9, 2010.

Dec. 28, 2010 Office Action issued in Chinese Application No. 200880024747.3 w/English translation.

Jul. 5, 2010 Search Report issued in European Application No. 08778207.4.

May 26, 2011 Office Action issued in related U.S. Appl. No. 12/656,090.

Dec. 23, 2010 Office Action issued in Chinese Application No. 200880024737.X (English-language only).

Sep. 13, 2010 Search Report issued in European Application No. 08778206.6.

* cited by examiner

METHOD FOR PRODUCING DISPLAY DEVICE

This application is a continuation of International Application No. PCT/JP2008/062855 filed Jul. 16, 2008, which claims priority to Japanese Patent Document No. 2007-186360, filed on Jul. 17, 2007, Japanese Patent Document No. 2008-005027, filed on Jan. 11, 2008, and Japanese Patent Document No. 2008-105109, filed on Apr. 14, 2008. The entire disclosures of the above-mentioned applications are incorporated herein by reference in their entireties.

BACKGROUND

The present disclosure is generally directed to a display device, such as, for example, a liquid crystal display device (LCD) used in a cellular phone. In particular, the present disclosure is directed to a method for producing a display device provided with a transparent protective part on a display part.

FIG. 7 illustrates a conventional type of display device known in the art. As shown in FIG. 7, a liquid crystal display device 101 is provided with a transparent protective part 103 formed from, for example, glass or plastic, on a liquid crystal display panel 102. In this conventional device, in order to protect the surface of the liquid crystal display panel 102 and a polarizing plate (not shown), a gap 105 between the liquid crystal display panel 102 and the protective part 103 is formed by spacers 104 arranged between the liquid crystal display panel 102 and the protective part 103.

However, the gap 105 between the liquid crystal display panel 102 and the protective part 103 scatters light, resulting in a decrease in contrast and luminance. The presence of the gap 105 also makes it more difficult to produce a thinner panel.

In view of these difficulties, it has been proposed to fill the gap between the liquid crystal display panel and the protective part with a resin (for example, see Japanese Patent Publication No. 2005-55641).

However, if foreign substances or air bubbles become trapped in the resin that fills the gap between the liquid crystal display panel and the protective part, it becomes necessary to conduct a repair operation by peeling apart the display panel and the protective part.

However, when the display panel and the protective part are peeled apart, there is a risk of causing damage, such as scratching and cracking the display panel and the protective part.

Furthermore, completely removing a cured resin adhered to the display panel and the protective part by a solvent is very difficult.

While there are some solvents which have high solubility against this type of cured resin, there are drawbacks with respect to safety. Moreover, in order to completely remove the solvent itself, a separate washing step is required.

SUMMARY

The present disclosure was made in consideration of these needs and other needs present in the conventional art. Accordingly, it is an object of embodiments to provide a method for producing a display device for which a repair operation can be carried out easily and reliably without damage to a bonding portion by a cured resin.

Embodiments are provided in order to achieve the above object, and include a method for producing a display device, the display device comprising a display part for displaying an image with a light-transmitting protective part provided on the display part, and a light-transmitting cured resin layer arranged between the display part and the protective part. The method for producing a display device according to the present invention includes the steps (a) to (c), and, depending on the presence of defects in the display device, the following additional steps (d) to (f) are performed:

(a) coating a resin composition, the resin composition comprising a raw material of the cured resin, on at least one of the display part and the protective part, (b) closely adhering the display part and the protective part with the resin composition interposed therebetween, and (c) arranging the cured resin layer between the display part and the protective part by curing the resin composition by irradiating UV rays on an external side of the protective part; and (d) separating the display part and the protective part from contact with each other by applying a wire having a smaller diameter than a thickness of the cured resin layer to a side face of the cured resin layer where the protective part and the display part are bonded together, and moving the wire through the cured resin layer, (e) peeling off and removing the cured resin adhered to the separated display part and the protective part by using a solution which contains an organic solvent, and (f) repeating the steps (a) to (c).

DETAILED DESCRIPTION OF THE DISCLOSURE

Figure 1:
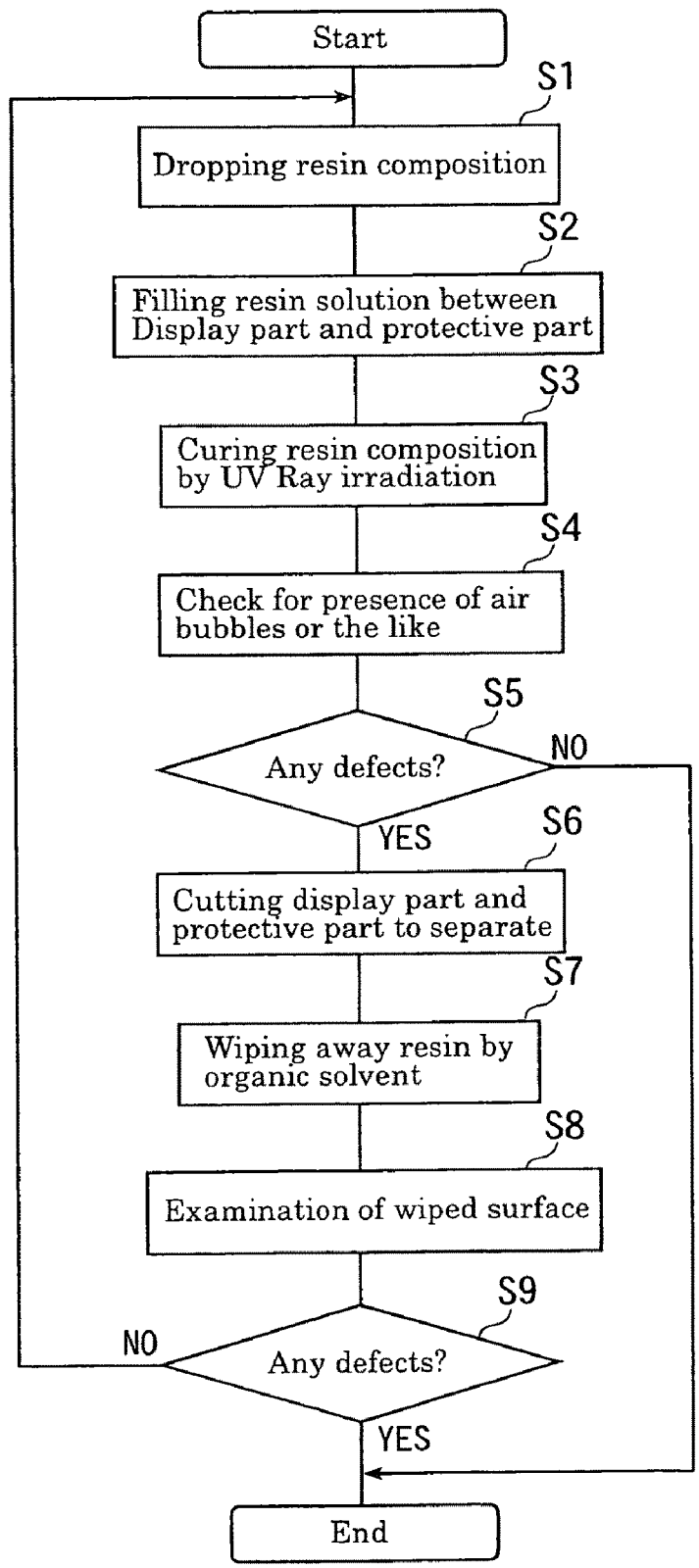
FIG. 1 is a flow diagram illustrating an example of a method for producing a display device according to embodiments.

According to the above-described embodiments, an advantageous effect is achieved even when the storage elastic modulus of the cured resin layer is less than $1.0 \times 10^5$ Pa.

In embodiments, the organic solvent can be selected from among organic solvents which are compatible when mixed with the resin composition before curing in a 1:1 volume ratio.

In embodiments, the removing solution may contain limonene or toluene as the organic solvent.

In embodiments, the removing solution may contain, in addition to limonene, ethyl alcohol or isopropyl alcohol as the organic solvent.

In embodiments, the protective part may be formed from a polymer material, and the removing solution contains limonene as the organic solvent.

According to embodiments, an advantageous effect is achieved even when the display device is a liquid crystal display device in which a polarizing plate is provided on a surface of the display part.

According to embodiments, after the display part and the protective part are bonded via a cured resin layer, if any defects are found, the display part and the protective part are separated by a wire having a smaller diameter than the thickness of the cured resin layer. The wire is then brought into contact with a side face of the cured resin layer where the protective part and the display part are bonded, and the wire is made to move through the cured resin layer. Afterwards, the cured resin layer adhered to the separated display part and the protective part is peeled off and removed using a removing solution comprising an organic solvent. Since a procedure for peeling off the display part and the protective part is not conducted during the repair operation, the display part and the protective part are not damaged by, for example, scratching and cracking.

In one embodiment, the display part and the protective part can be separated by cutting the cured resin layer more smoothly and quickly when the modulus of elasticity of the cured resin layer is less than $1.0 \times 10^5$ Pa.

According to one embodiment, by selecting an organic solvent that is compatible when mixed with the resin composition before curing in a 1:1 volume ratio (for example, limonene or toluene), the cured resin layer that is adhered to the separated display part and the protective part can be dissolved and removed smoothly and reliably.

Moreover, in embodiments, with respect to the removing solution, when a solvent containing limonene or toluene is selected in the organic solvent, change of properties of the polarizing plate provided on the surface of the display part does not result.

Furthermore, if ethyl alcohol or isopropyl alcohol is used in addition to limonene as the organic solvent in the removing solution, the removing solution is capable of improving the peeling properties of the cured resin, and thus improves operational efficiency by increasing volatility of the removing solution.

According to one aspect of the present disclosure, especially for a liquid crystal display device in which a polarizing plate is provided on the surface of a display part, a repair operation can be carried out easily and quickly.

As discussed above, one embodiment provides a method for producing a display device of which a repair operation can be carried out easily and reliably without damage to a bonding portion caused by the cured resin.

Embodiments of the present disclosure will now be described in detail with reference to the drawings.

FIG. 1 is a flow diagram illustrating an example of a method for producing a display device according to an embodiment.

FIGS. 2(a) to (c) and FIGS. 3(a) to (c) are cross-sectional views schematically illustrating the method for producing the display device according an embodiment.

Figure 2A:
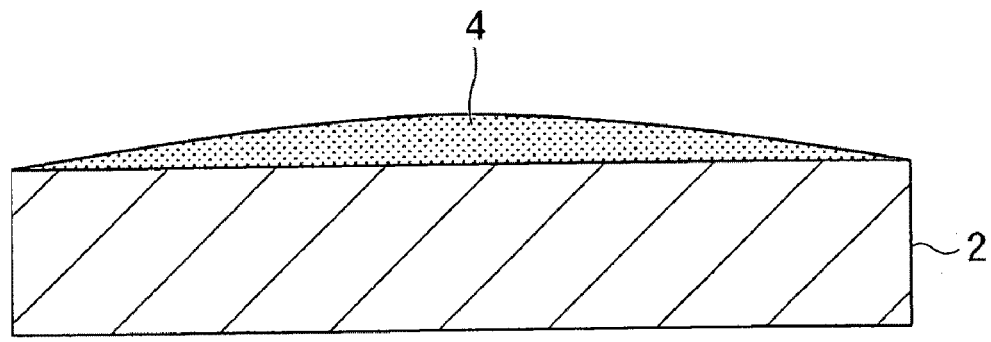
FIGS. 2(a) to (c) are cross-sectional views schematically illustrating the method for producing a display device according to embodiments.

As shown in FIG. 2(a), a resin composition layer 4 is coated and formed by, for example, dropping a photocurable resin composition (referred to as "resin composition," "resin," or the like, hereinafter) in a predetermined amount onto the surface of a display part 2 (step S1).

In embodiments, this resin composition layer 4 can also be formed by a printing method.

In embodiments, a spacer for determining the distance between the display part 2 and a protective part 3 is not required to be used. Instead, as an example, the distance between the display part 2 and the protective part 3 can be determined by a positioning means (not shown). However, the present disclosure is not meant to be limited to such embodiments and, thus, in various embodiments a spacer can also be used.

In various embodiments, including a liquid crystal display device, a polarizing plate (not shown) is provided on the display part 2.

As a protective part, in embodiments, a light-transmitting glass plate or a substrate formed of a polymer material (plastic) such as an acrylic resin (for example, PMMA: polymethyl methacrylate) may be suitably used as the protective part 3.

Such a protective part 3 is lowered while being kept in a horizontal state, and the protective part 3 is then fixed at a predetermined position by a positioning hoist mechanism (not shown).

Figure 2B:
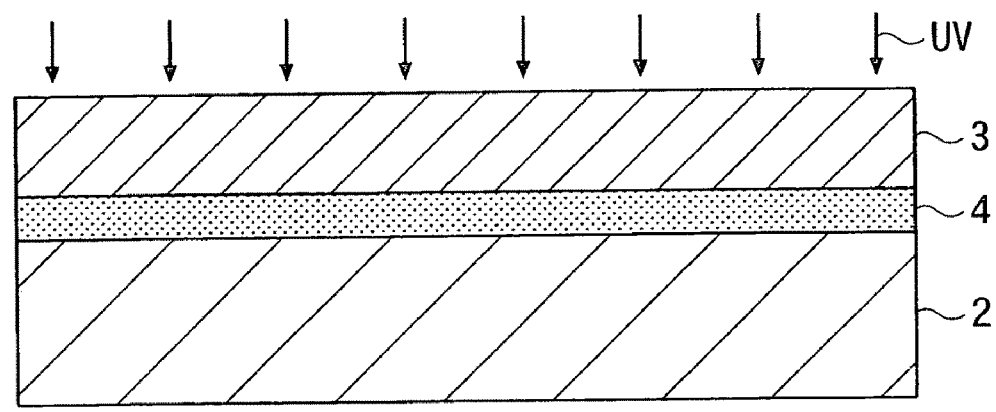
Figure 2C:
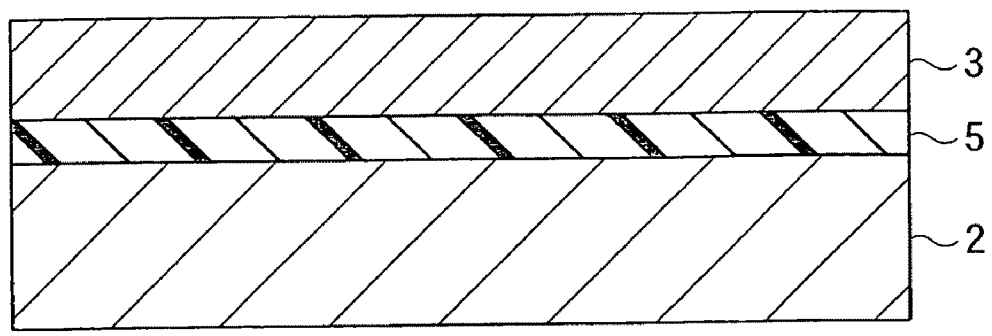
Figure 3A:
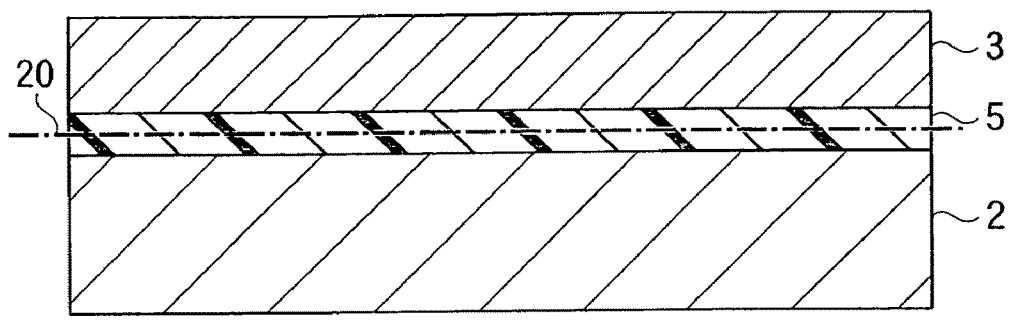
FIGS. 3(a) to (c) are cross-sectional views schematically illustrating a method for producing the display device according to the present disclosure.
Figure 3B:
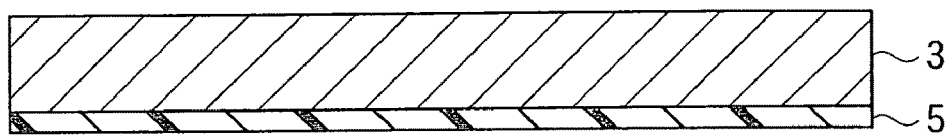
Figure 3B:
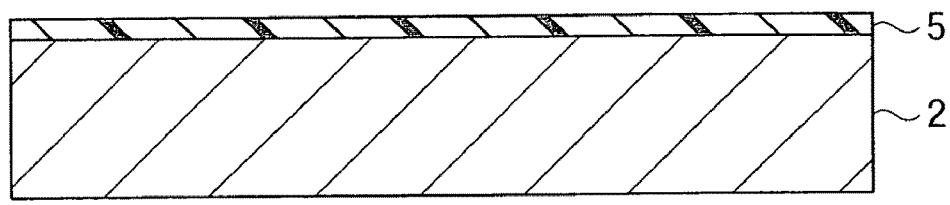
Figure 3C:
Figure 3C:
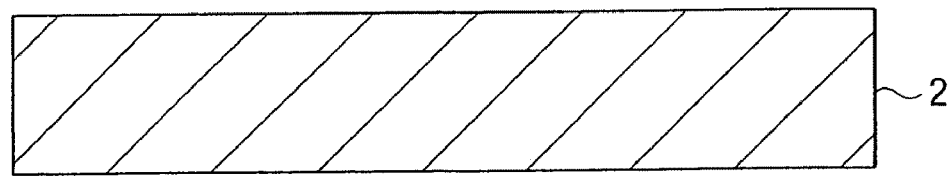

As shown in FIG. 2(b), the resin composition layer 4 is placed and fills a gap between the display part 2 and the protective part 3 (step S2).

As a photocurable resin composition, in embodiments, a resin composition which has, after curing, a transmittance of 90% or higher, a storage elastic modulus at 25° C. of $1.0 \times 10^5$ Pa or less, and a curing shrinkage ratio of 5% or less can be used.

According to one embodiment, the viscosity of the photocurable resin composition is not especially limited. However, from the perspective of the wet spreading speed and tendency not to run over (surface tension), in embodiments, a photocurable resin composition having a viscosity in a range of 1,000 mPa·s to 5,000 mPa·s, such as a range of 2,000 mPa·s to 3,000 mPa·s, can be used.

More specifically, the photocurable resin composition may have a photoreactive acrylate material, such as polyurethane acrylate and isobornyl acrylate, and a photopolymerization initiator as main components, and may include additional additives, such as a sensitizing agent, a plasticizer, transparent particles and the like, within the scope of the object of the present disclosure.

Examples of the photopolymerization initiator which may be used include 1-hydroxy-cyclohexyl-phenyl-ketone (sold under the name "IRGACURE 184" manufactured by Ciba Specialty Chemicals Inc.), and the like.

The protective part 3 may be provided with a UV-region cutting function in order to protect the display part 2 against UV rays. In such an embodiment, as the photopolymerization initiator used in the present embodiment, it is beneficial to use a photopolymerization initiator that can cure the resin composition even in the visible light region (for example, sold under the name SPEEDCURE TPO, manufactured by Nihon SiberHegner KK).

In embodiments, the resin composition is prepared such that the cured resin obtained by curing the resin composition with UV irradiation has a storage elastic modulus (at 25° C.) of $1 \times 10^5$ Pa or less, such as $1 \times 10^3$ to $1 \times 10^5$ Pa, a refractive index of 1.45 or more to 1.55 or less, such as 1.51 or more to 1.52 or less, and a transmittance of 90% or higher in the visible light region when the cured resin has a thickness of 100 μm. Even when the major resin components constituting the resin composition are the same, if an additional resin component or monomer component added to the major resin components is different, the cured resin formed by curing such a curable resin composition may have a storage elastic modulus (at 25° C.) that exceeds $1 \times 10^5$ Pa.

In embodiments, the resin composition is prepared so as to have a curing shrinkage ratio of 5.0% or less, such as 4.5% or less, 4.0% or less, or 0 to 2%. Consequently, the internal stress that builds up in the cured resin during curing of the resin composition can be reduced, and distortion at the interface between the cured resin layer 5 and the display part 2 or the protective part 3 can be prevented.

When the resin composition is arranged between the display part 2 and the protective part 3 and then cured, the amount of light scattered at the interface between the cured resin layer 5 and the display part 2 or the protective part 3 can be reduced. As a result, the luminance and the visibility of the display image can be improved.

The magnitude of the internal stress that builds up in the cured resin during curing can be evaluated by dropping the resin composition onto a flat plate, curing the resin composition, and measuring the average surface roughness of the resulting cured resin. In practice, the distortion generated at the interface between the display part or the protective part and the cured resin composition arranged therebetween can be disregarded if, for example, a cured resin evaluated by dropping 2 mg of the resin composition onto a glass plate or an acrylic plate and cured by UV irradiation to a 90% or higher cure ratio has an average surface roughness of 6.0 nm or less. However, regarding the resin composition of the present disclosure, this average surface roughness can be maintained at 6.0 nm or less, such as 5.0 or less; or in the range of 1 to 3 nm.

As a plate, in embodiments, a glass plate for sandwiching the liquid crystals of a liquid crystal cell, or used as a protective plate for a liquid crystal cell can be used.

Furthermore, in embodiments, an acrylic plate can also be used as the protective plate for a liquid crystal cell. Such glass plates or acrylic plates typically have an average surface roughness of 1.0 nm or less.

Subsequently, as shown in FIG. 2(*c*), the resin composition layer 4 is irradiated with UV rays via the protective part 3 to cure the resin (step S3).

According to embodiments, the irradiation direction of the UV rays is not especially limited. However, from the standpoint of achieving more uniform curing of the resin, a direction perpendicular to the surface of the protective part 3 of the display part 2 is suitable.

UV rays may also be simultaneously directly irradiated from the external side face of the resin composition layer 4 between the display part 2 and the protective part 3, using an optical fiber, for example.

Then, in step S4, the presence of foreign substances or air bubbles mixed in the cured resin layer 5 that is filled between the display part 2 and the protective part 3 is checked.

In step S5, if the result of the check is favorable, the method is finished.

On the other hand, if a defect, such as foreign substances or air bubbles being mixed in the cured resin layer 5 between the display part 2 and the protective part 3, is confirmed, a repair operation is carried out.

As part of the repair operation, in step S6, the display part 2 and the protective part 3 are separated by cutting the cured resin layer 5 using a wire 20, as illustrated in FIGS. 3(*a*) and 3(*b*).

Figure 4:
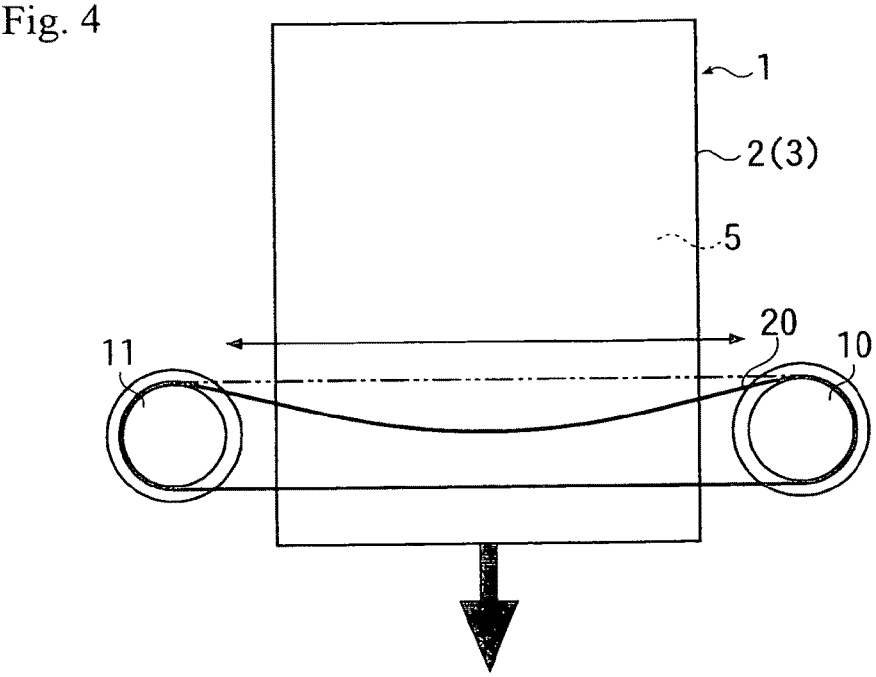
FIG. 4 is an explanatory diagram illustrating an example of a method for cutting a cured resin layer according to embodiments.
Figure 5:
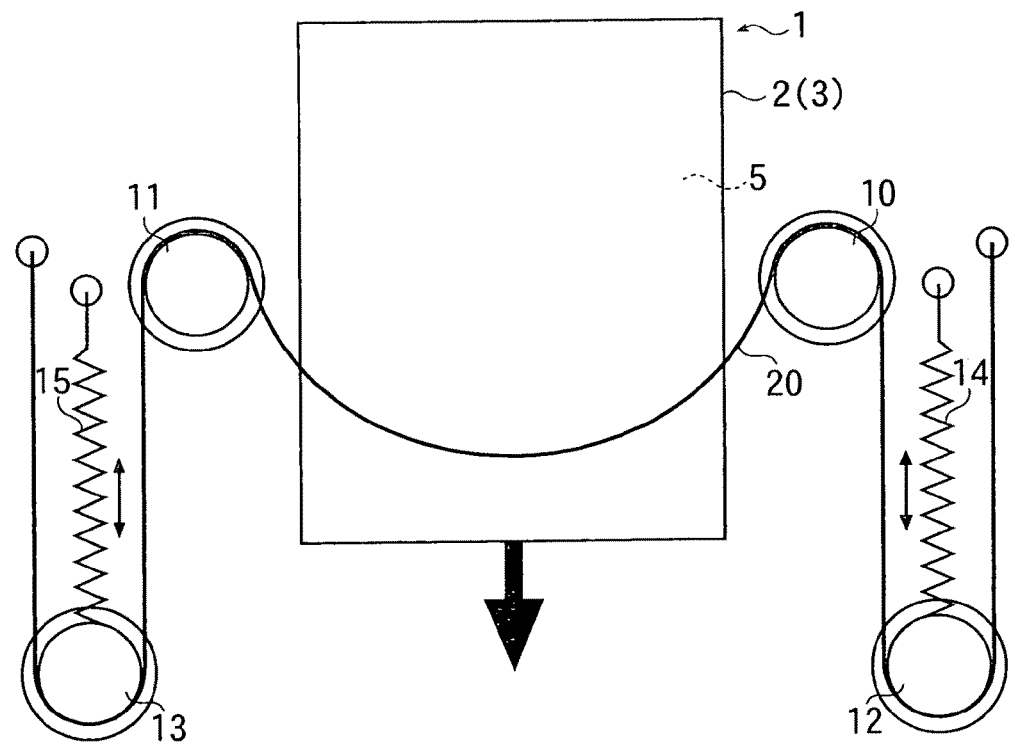
FIG. 5 is an explanatory diagram illustrating another example of a method for cutting a cured resin layer according to embodiments.

FIGS. 4 and 5 are explanatory diagrams illustrating embodiments of a method for cutting a cured resin layer according to the present disclosure.

In the embodiment illustrated in FIG. 4, the wire 20 is passed over a pair of pulleys 10 and 11. The cured resin layer 5, located between the display part 2 and the protective part 3, is pressed against the wire 20 while the wire 20 is slid in a left-right direction as shown in FIG. 4, which corresponds to the width direction of the display part 2 and the protective part 3. Then, a panel 1 is moved in a direction orthogonal to the wire 20 so as to cut the cured resin layer 5 and thereby separate the display part 2 and the protective part 3.

In the embodiment illustrated in FIG. 5, the wire 20 is passed over a plurality of pulleys 10 to 13 which are arranged so as to form a pair of pulley blocks. Furthermore, tension springs 14 and 15, for absorbing slack in the wire 20 between the pulleys 10 and 11, are connected to the pulleys 12 and 13, respectively, which move as a pulley block.

In another embodiment, the cured resin layer 5 between the display part 2 and the protective part 3 is pressed against the wire 20. Then, the panel 1 is moved in a direction orthogonal to the wire 20 to cut the cured resin layer 5 and thereby separate the display part 2 and the protective part 3.

Here, the slack in the wire 20 between the pulleys 10 and 11 is absorbed by the elastic force of the tension springs 14 and 15, such that the wire 20 between the pulleys 10 and 11 is constantly in a taut state.

As the wire 20 used in embodiments, a metal wire, such as one made of carbon steel, (for example, piano wire) or the like can be used.

The thickness (diameter) of the wire 20 is not especially limited, as long as it is less than the thickness of the cured resin layer 5 between the display part 2 and the protective part 3. However, from the perspective of cutting performance, a suitable thickness of a wire can be in the range of 50 μm to 100 μm.

After the display part 2 and the protective part 3 have thus been separated, in step S7, the cured resin remaining on the surfaces of the display part 2 and the protective part 3 is wiped away by a removing solution containing an organic solvent (step S7).

FIGS. 6(*a*) to (*c*) are explanatory diagrams schematically illustrating a method for wiping away a cured resin by an organic solvent.

FIGS. 6(*a*) and 6(*b*) illustrate an embodiment where the resin composition on the display part (for example, LCD cell) or protective part (for example, plastic plate or glass plate) is cured by the irradiation of UV rays.

According to embodiments, as illustrated in FIG. 6(*c*), an organic solvent-containing removing solution is coated by dropping or spraying, for example, onto the cured resin. The coated cured resin is then left for approximately 5 minutes at room temperature, for example, to impregnate the removing solution into the cured resin, which then swells.

The cured resin is then wiped away using a wipe member formed of an elastomer or the like which is impregnated with the same solvent as the organic solvent of the removing solution that was coated on the cured resin.

As the organic solvent contained in the removing solution, an organic solvent which is compatible when mixed with the resin composition before curing in a 1:1 volume ratio, or more specifically, an organic solvent having a small solution parameter (SP value), can be used. In embodiments, an organic solvent having a solution parameter of less than 9 can be suitably used.

In embodiments, by using a removing solution containing such an organic solvent, the cured resin remaining on the surfaces of the display part 2 and the protective part 3 can be completely removed.

For a liquid crystal display device, it is preferable to use an organic solvent which does not cause damage to the device, such as, for example, changes to the polarizing plate (made of triacetyl cellulose) provided on the display part 2.

According to one embodiment, as organic solvents which satisfy the above requirements, suitable organic solvents include limonene ($C_{10}H_{16}$, solution parameter: 0.6) or toluene ($C_7H_8$, solution parameter: 8.8).

In order to improve the wiping properties and volatility, ethyl alcohol or isopropyl alcohol may be added to the removing solution. From the perspective of improving safety, limonene is a suitable organic solvent.

When a substrate formed of a polymer material (especially a PMMA substrate) is used as the protective part 2, limonene may be used as the organic solvent, allowing the cured resin to be wiped away without causing any changes to the surface of the substrate.

Further, if the organic solvent is limonene, the wiping properties and volatility can be improved by adding ethyl alcohol and/or isopropyl alcohol.

After the wiping step, the wiped surfaces of the display part 2 and the protective part 3 are examined to observe any changes in the appearance with, for example, in step S8. If there is no cured resin residue present and no changes on the surface have occurred, the process returns to step S1, and the above-described steps are repeated from the start in step S9.

Alternatively, if in step S9, there is a cured resin residue remaining on the surfaces of the display part 2 and the protective part 3, or if surface changes have occurred, the produced display device is treated as a defective product.

The present disclosure is not limited to the above-discussed embodiments, and various modifications can be made thereto.

For example, in the above-discussed embodiment, the display device was moved against the wire when cutting the cured resin layer 5. However, the present disclosure is not limited thereto and the wire may be moved against the display device.

In addition, the present disclosure is not limited to the above-discussed liquid crystal display device. For example, the present invention may also be applied to various flat panel display panels, such as an organic EL device.

EXAMPLES

Embodiments will now be described in more detail using the following examples and comparative examples. However, the present invention is not limited to the following embodiments.

[Preparation of Coating Solution]

A resin composition was prepared by kneading in a kneader 70 parts by weight of an ester compound formed from a maleic anhydride adduct of a polyisoprene polymer and 2-hydroxyethyl methacrylate, 30 parts by weight of dicyclopentenyl oxyethyl methacrylate, 10 parts by weight of 2-hydroxybutyl methacrylate, 30 parts by weight of a terpene series hydrogenated resin, 140 parts by weight of a butadiene polymer, 4 parts by weight of a photopolymerization initiator, and 0.5 parts by weight of a visible light region photopolymerization initiator.

<Physical Properties of the Cured Resin According to the Present Invention: Reference Example>

[Transmittance and Modulus of Elasticity]

The resin composition prepared in the above-described blend was dropped onto a white glass plate having thickness of 100 μm, to be used as a protective part. The plate was transferred by a UV-conveyor in a UV-ray irradiation apparatus to cure the resin. The thickness of the cured resin was 100 μm.

The transmittance of this cured resin was measured using a UV-Visible Spectrophotometer (V-560, JASCO Corporation) to be 90% or higher.

Next, using a viscoelastometer (sold under the name "DMS6100", manufactured by Seiko Instruments Inc.), the modulus of elasticity (measurement frequency 1 Hz, 25° C.) of the cured resin was measured and the measured result was $1.0 \times 10^4$ Pa.

[Curing Shrinkage Ratio]

For the curing shrinkage ratio, specific gravities of the resin solution before curing, and the cured solid product were measured by an electronic densimeter (sold under the name "SD-120L", manufactured by Mirage). The curing shrinkage ratio is calculated by the following equation based on the difference of the specific gravities between the resin solution before curing and the cured solid product. In the present example, curing shrinkage ratio was 1.8%.

Curing shrinkage ratio(%)=(Cured product specific gravity−Resin solution specific gravity) /Cured product specific gravity×100

[Surface Roughness Measurement]

2 mg of the above resin composition was dropped onto a glass plate for an LCD cell. The distortion (Ra: average surface roughness) in a predetermined region (2.93 mm×2.20 mm) of the glass plate surface due to the internal stress generated during the curing reaction by the UV irradiation was measured by a three-dimensional non-contact surface roughness meter (such as those manufactured by Zygo K.K.) and the measured result was 2.7 nm.

In the present example, the cured resin had a modulus of elasticity of $1 \times 10^4$ Pa and a curing shrinkage ratio of 1.8%. Consequently, the average surface roughness Ra was 2.7 nm, and there was hardly any distortion, meaning that superior results were obtained. Therefore, a display device which is free from distortion can be obtained by arranging and filling such a cured resin between the display part and the protective part.

Examples and Comparative Examples

Figure 6A:
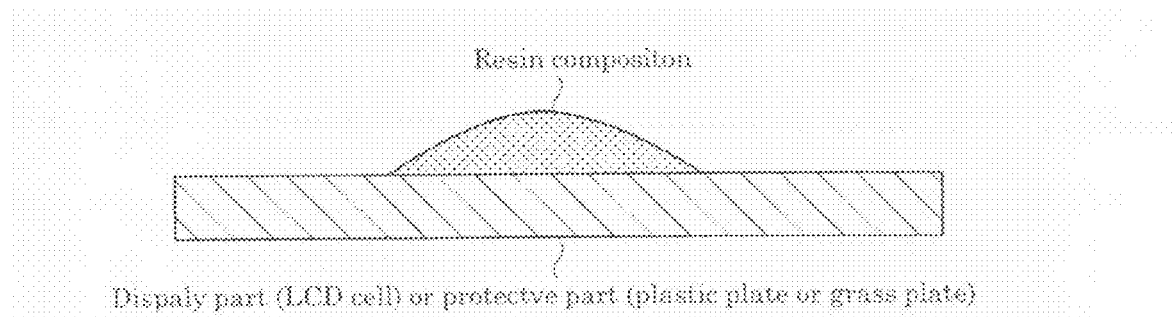
FIGS. 6(a) to (c) are explanatory diagrams schematically illustrating a method for wiping away a cured resin by an organic solvent.
Figure 6B:
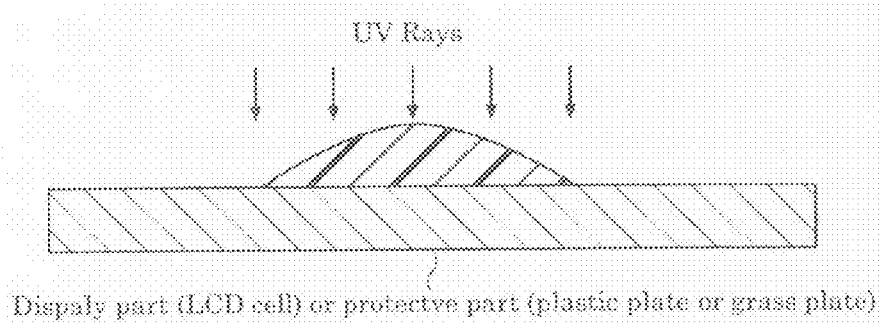

As shown in FIG. 6(a), the above-discussed resin composition was coated onto the above-described glass plate for a protective part or glass plate for an LCD cell. Then, as shown in FIG. 6(b), the resin composition was cured by irradiating with UV rays.

Figure 6C:
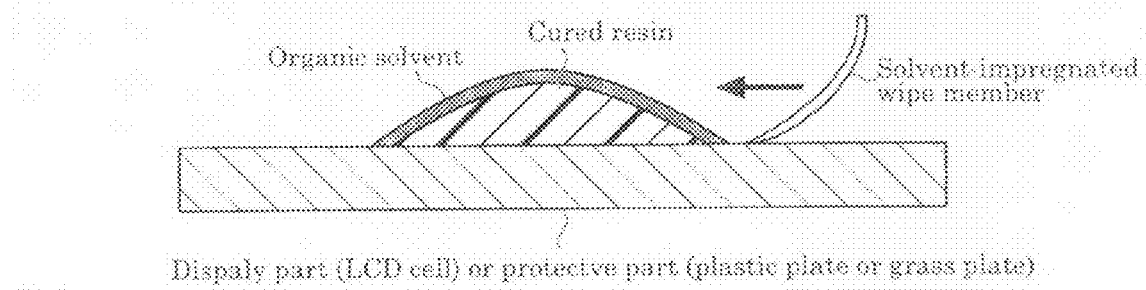
Figure 7:
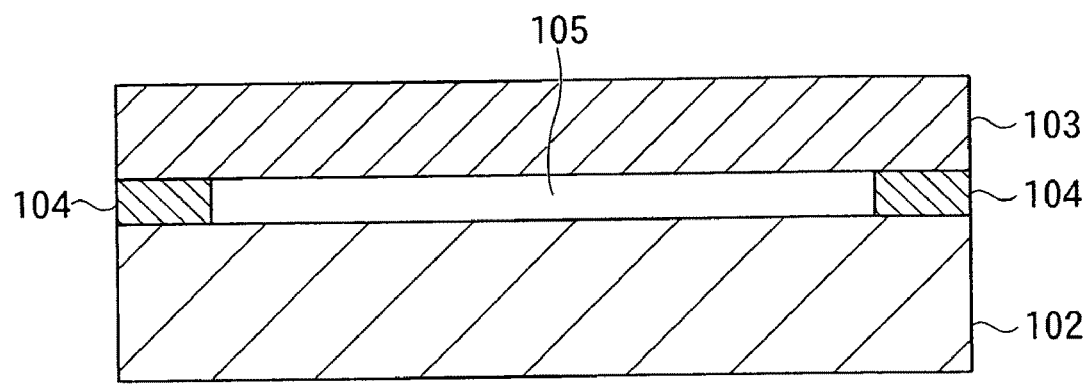
FIG. 7 is cross-sectional view illustrating a configuration of a conventional display device.

Next, as shown in FIG. 6(c), limonene, toluene, or MEK was coated onto the cured resin as an organic solvent, and the coated cured resin was left for 5 minutes at room temperature.

Furthermore, by using a wipe member impregnated with the same organic solvent as that coated on the cured resin, the cured resin was wiped away.

Subsequently, the wiping properties of each sample were confirmed using a microscope to observe any changes in the appearance of each sample. These results are shown in Table 1.

In Table 1, samples which could be wiped without any resulting problems with their appearance are marked with a "circle", while samples which had problems with their appearance are marked with a "cross".

TABLE 1

Test results of wiping properties of cured resin

|  | Limonene | Toluene | MEK |
|---|---|---|---|
| Grass plate | ○ | ○ | x |
| LCD cell | ○ | ○ | x |

As shown in Table 1, it is clear that when limonene or toluene was used as the organic solvent, the wiping could be carried out without problems in terms of appearance.

On the other hand, when MEK was used as the organic solvent, the wiping could not be completely carried out. In addition, changes were seen in the polarizing plate on the glass plate for an LCD cell.

<Cured Resin Physical Properties after Wiping Step in the Examples>

[Transmittance, Modulus of Elasticity, and Curing Shrinkage Ratio After Wiping Cured Resin]

The resin composition was dropped under the same conditions as the above-described Reference Example onto a glass plate for a protective part where the wiping step was finished. The resin composition was then cured under the same conditions.

The transmittance of this cured resin was measured under the same conditions as the above-described Reference Example. The obtained result was equivalent (within the margin of error) to the result of the Reference Example.

Next, the modulus of elasticity of this cured resin was measured under the same conditions as the above-described Reference Example. The obtained result was equivalent (within the margin of error) to the result of the Reference Example.

In addition, the curing shrinkage ratio of this cured resin was measured and calculated under the same conditions as the above-described Reference Example. The obtained result was equivalent (within the margin of error) to the result of the Reference Example.

[Measurement of Surface Roughness After Wiping Cured Resin]

The resin composition was dropped under the same conditions as the above-described Reference Example onto a glass plate for an LCD cell of which the wiping step was finished. The distortion of the surface was measured under the same conditions as the above-described Reference Example. The measured average surface roughness Ra was equivalent (within the margin of error) to that of the Reference Example.

Thus, in the present disclosure, none of the obtained results for the transmittance, modulus of elasticity, curing shrinkage ratio, and average surface roughness changed from before to after repair.

Based on these results, according to the present disclosure, a repair operation can be carried out easily and reliably without damage to the bonded portion caused by the cured resin. It is thus understood that a display device without distortion can be obtained in a good yield.

Reference Example

[Preparation of Coating Solution]

The resin composition of Reference Example was prepared by kneading in a kneader 50 parts by weight of polybutadiene acrylate, 20 parts by weight of hydroxyethyl methacrylate, 3 parts by weight of a photopolymerization initiator, and 1 part by weight of a visible light region photopolymerization initiator.

[Transmittance, Modulus of Elasticity, and Curing Shrinkage Ratio]

The resin composition prepared in the above-described composition was dropped onto the above-described glass plate for a protective part, and cured under the same conditions as described above.

The transmittance of this cured resin was measured under the same conditions as the above examples and the measured result was 90% or higher.

Next, the modulus of elasticity of the cured resin was measured under the same conditions as the above examples and the measured result was $2.0 \times 10^7$ Pa.

Furthermore, the curing shrinkage ratio was measured and calculated under the same conditions as the above examples and the calculated result was 5.6%.

[Measurement of Surface Roughness]

The resin composition was dropped under the same conditions as for the above-described examples onto a glass plate for an LCD cell. The distortion of the surface was measured under the same conditions as for the above examples and the measured result was 12.4 nm.

In the present example, the cured resin had a modulus of elasticity of $2 \times 10^7$ Pa and a curing shrinkage ratio of 5.6%. Consequently, the average surface roughness Ra was 12.4 nm, and the level of distortion was greater than the roughness of the above examples.

Furthermore, the above resin composition was coated onto the above-described glass plate for a protective part or glass plate for an LCD cell. Then, the resin composition was cured by irradiating with UV rays.

Next, as an organic solvent, limonene or toluene was coated onto the cured resin and the coated cured resin was left to sit for 5 minutes at room temperature.

Further, by using a wipe member impregnated with the same organic solvent as that coated on the cured resin, the cured resin was wiped away.

Subsequently, the wiping properties of each sample were confirmed using a microscope to observe changes in appearance. It was observed that the cured resin was not able to be completely wiped away, and problems occurred in the appearance. Nevertheless, the produced samples were at a level which still allowed practical use.

From the above results, it was confirmed that in the present disclosure it is advantageous for the modulus of elasticity of the cured resin not to exceed $1 \times 10^5$ Pa.

The invention claimed is:

1. A method for producing a display device, the display device comprising a display part for displaying an image and a light-transmitting protective part provided on the display part, a light-transmitting cured resin layer arranged between the display part and the protective part, the method comprising the steps of:
   (a) coating a resin composition, the resin composition comprising a raw material of the cured resin, on at least one of the display part and the protective part,
   (b) adhering the display part and the protective part with the resin composition interposed therebetween, and
   (c) arranging a cured resin layer between the display part and the protective part by curing the resin composition by irradiating UV rays on an external side of the protective part; and
   wherein the following additional steps (d) to (f) are performed to remove defects present in the display device:
   (d) separating the display part and the protective part by applying a wire having a smaller diameter than a thickness of the cured resin layer at a side face of the cured resin layer where the protective part and the display part are bonded, and moving the wire through the cured resin layer, (e) peeling off and removing the cured resin adhered to the separated display part and the protective part by a removing solution comprising at least one organic solvent, the at least one organic solvent comprises limonene, the at least one organic solvent further comprises ethyl alcohol or isopropyl alcohol, and (f) repeating the steps (a) to (c).

2. The method for producing a display device according to claim 1, wherein a storage elastic modulus of the cured resin layer is less than $1.0 \times 10^5$ Pa.

3. The method for producing a display device according to claim 1, wherein the at least one organic solvent is compatible when mixed with the resin composition before curing in a 1:1 volume ratio.

4. The method for producing a display device according to claim 1, wherein the protective part is formed of a polymer material, and the removing solution comprises limonene as the at least one organic solvent.

5. The method for producing a display device according to claim 1, wherein the display device is a liquid crystal display device in which a polarizing plate is provided on a surface of the display part.

* * * * *

UNITED STATES PATENT AND TRADEMARK OFFICE
CERTIFICATE OF CORRECTION

Page 1 of 1

PATENT NO. : 8,152,947 B2
APPLICATION NO. : 12/656088
DATED : April 10, 2012
INVENTOR(S) : Tomoyuki Toyoda et al.

It is certified that error appears in the above-identified patent and that said Letters Patent is hereby corrected as shown below:

Title pg, Item (73) Assignee please correct to show the city as Tokyo.

Signed and Sealed this
Tenth Day of July, 2012

David J. Kappos
*Director of the United States Patent and Trademark Office*